(12) United States Patent
Vedefors

(10) Patent No.: US 6,494,392 B1
(45) Date of Patent: Dec. 17, 2002

(54) APPARATUS FOR DISINTEGRATING SUBSTANCES

(76) Inventor: Kent Vedefors, Brahegatan 22, S-563 32 Gränna (SE)

( * ) Notice: Subject to any disclaimer, the term of this patent is extended or adjusted under 35 U.S.C. 154(b) by 135 days.

(21) Appl. No.: 09/695,469

(22) Filed: Oct. 24, 2000

Related U.S. Application Data

(63) Continuation-in-part of application No. 09/407,226, filed on Sep. 27, 1999, now abandoned.

(51) Int. Cl.[7] ............................ B02C 18/06; B02C 18/24
(52) U.S. Cl. ................. 241/56; 241/101.78; 241/169.1; 241/199.12; 241/278.1; 241/282.1
(58) Field of Search ............................. 241/168, 169.1, 241/169.2, 199.9, 56, 199.12, 292.1, 278.1, 282.1, 282.2, 101.78; 56/16.7

(56) References Cited

U.S. PATENT DOCUMENTS

| | | | | |
|---|---|---|---|---|
| 4,121,775 A | * | 10/1978 | Roseberg et al. | 241/169.2 |
| 5,020,309 A | * | 6/1991 | Hopkins | 241/56 X |
| 5,156,084 A | * | 10/1992 | Lin | 210/380.1 |
| 5,533,801 A | * | 7/1996 | Safont et al. | 241/199.12 |
| 5,794,864 A | * | 8/1998 | Hammett et al. | 241/169.1 |
| 5,842,651 A | * | 12/1998 | Smothers | 241/100 |
| 5,931,397 A | * | 8/1999 | Herman et al. | 241/169.1 |
| 5,960,709 A | * | 10/1999 | Yip | 241/199.12 |
| 6,035,771 A | * | 3/2000 | Conran et al. | 241/199.12 |
| 6,113,016 A | * | 9/2000 | Vedefors | 241/169.1 |
| 6,135,376 A | * | 10/2000 | Vedefors | 241/278.1 |

* cited by examiner

Primary Examiner—John M. Husar
(74) Attorney, Agent, or Firm—Fasth Law Offices; Rolf Fasth

(57) ABSTRACT

The apparatus has a holder having inner grip elements disposed at a periphery of the holder. A bearing assembly is rotatably attached to the holder so that it is co-axial with a first axis. A driving source is rotatable engaging the bearing assembly. A wheel is eccentrically mounted on the bearing assembly and the wheel has outer grip elements that cooperate with the inner grip elements. The wheel is rotatable about a second axis that is not co-axial with the first axis. A first knife member is attached to the wheel and coaxial therewith and a second knife member is eccentrically mounted on the wheel so that the second knife member is rotatable about the first axis.

20 Claims, 7 Drawing Sheets

APPARATUS FOR DISINTEGRATING SUBSTANCES

PRIOR APPLICATION

This is a continuation-in-part application of U.S. patent application Ser. No. 09/407,226, filed Sep. 27, 1999 now abandoned.

FIELD OF THE INVENTION

The present invention relates of a combination device for disintegrating substances, such as vegetables, grass and meat.

BACKGROUND AND SUMMARY OF THE INVENTION

When mowing a lawn it is sometimes necessary to discard debris, such as sticks and pine cones, that are scattered on the lawn. Lawnmower knives are often made dull or even damaged by debris because there is no convenient way of discarding and disintegrating the debris and it is tempting to rely on the lawnmower knives to disintegrate the debris. There is a need to conveniently discard and disintegrate debris on the lawn without damaging the rotating lawnmower knives.

The apparatus of the present invention may not only be used to mow a lawn but also may be used to disintegrate debris without damaging the lawnmower knives. One feature is that the knives rotate eccentrically so that a relatively short knife length may cover a large area and if the knife hits an object, the impact is not as great as with concentrically rotating knives. The apparatus may also include a gearing mechanism so that the driving member may rotate at a lower revolution per minute than the rotation of the knife.

More particularly, the apparatus of the present invention has a holder with inner grip elements disposed at a periphery of the holder. A bearing assembly is rotatably attached to the holder so that it is co-axial with a first axis. A driving source is rotatable engaging the bearing assembly. A wheel is eccentrically mounted on the bearing assembly and the wheel has outer grip elements that cooperate with the inner grip elements. The wheel is rotatable about a second axis that is not co-axial with the first axis. A first knife member is attached to the wheel and coaxial therewith and a second knife member is eccentrically mounted on the wheel so that the second knife member is rotatable about the first axis.

DETAILED DESCRIPTION

Figure 2A:
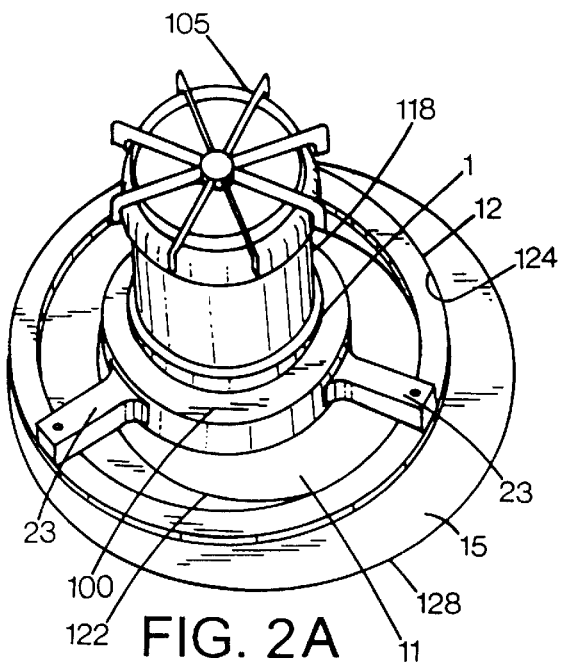
FIG. 2A is a perspective top view of the apparatus including a rotatable cutting disc.
Figure 2B:
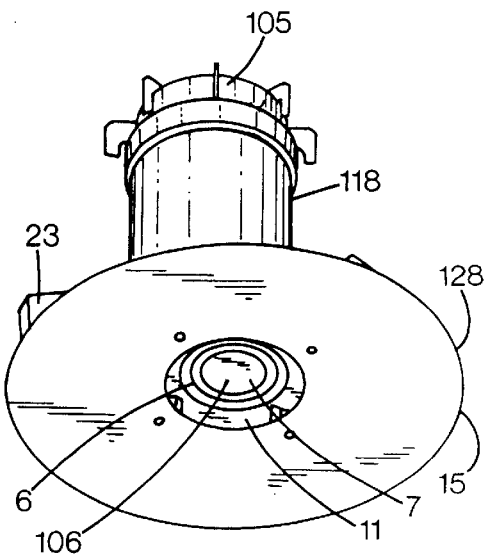
FIG. 2B is a perspective bottom view of the apparatus shown in FIG. 2A.
Figure 2C:
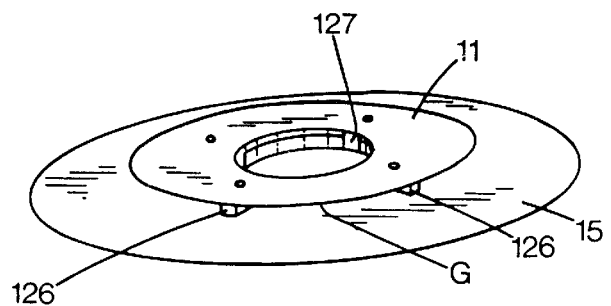
FIG. 2C is a perspective top view of a knife assembly of the present invention.
Figure 3:
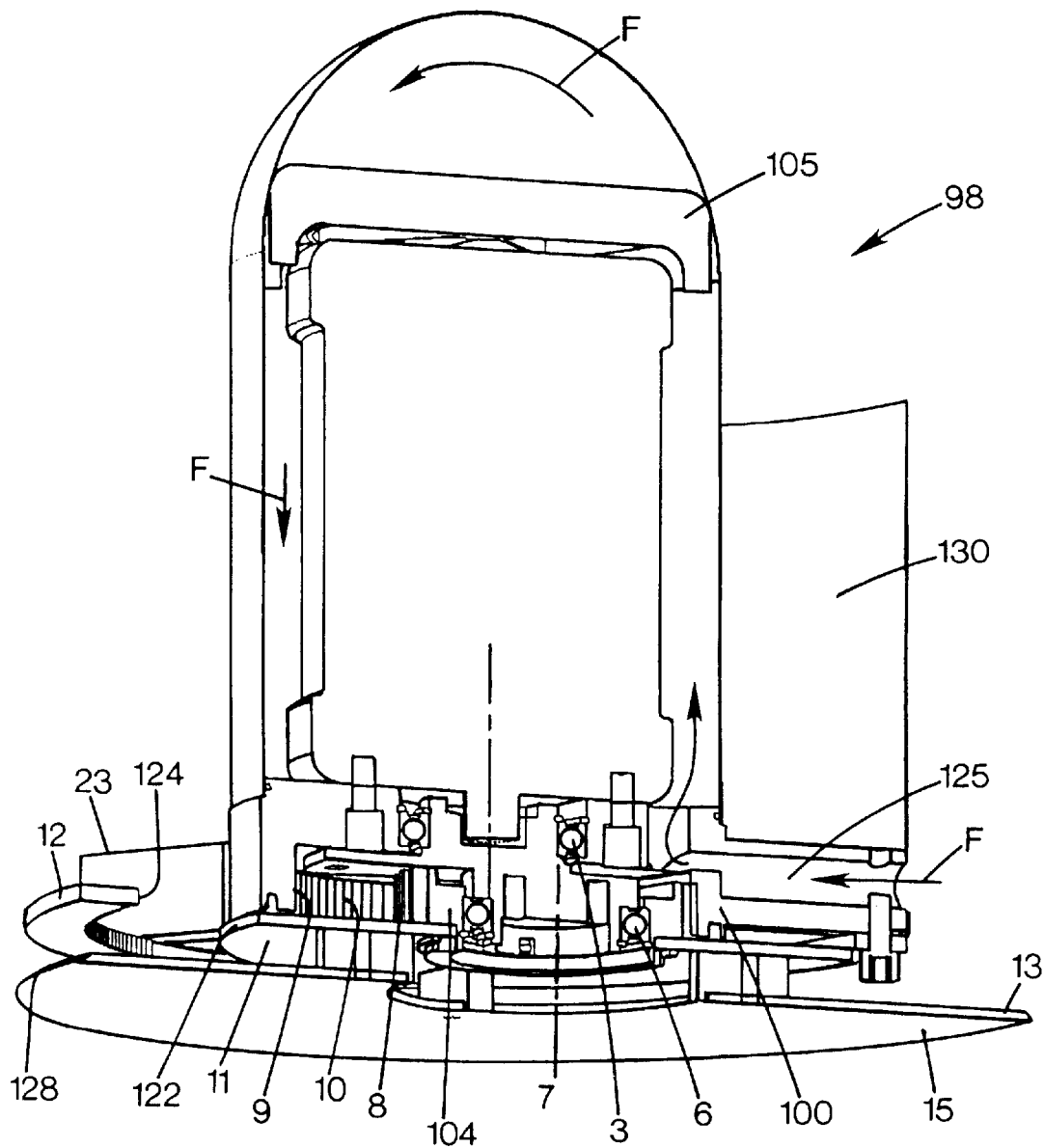
FIG. 3 is a cross-sectional view of the apparatus shown in FIGS. 2A–2B and including a funnel.

With reference to FIGS. 1–3, the present invention is an apparatus that permits disintegration of substances with a rotating knife that is disposed below the apparatus and substances may also be disintegrated by being fed downwardly into a funnel and cut by an eccentrically rotating knife.

Figure 1A:
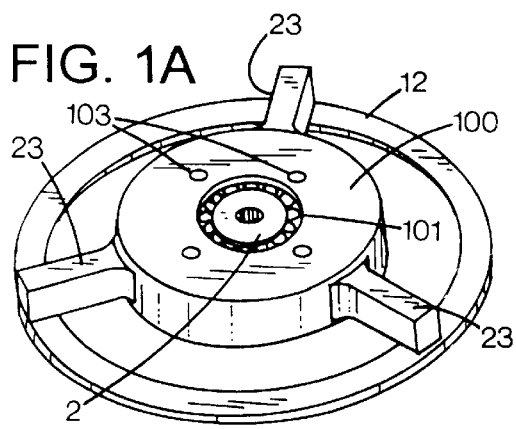
FIG. 1A is a perspective top view of holding member.
Figure 1B:
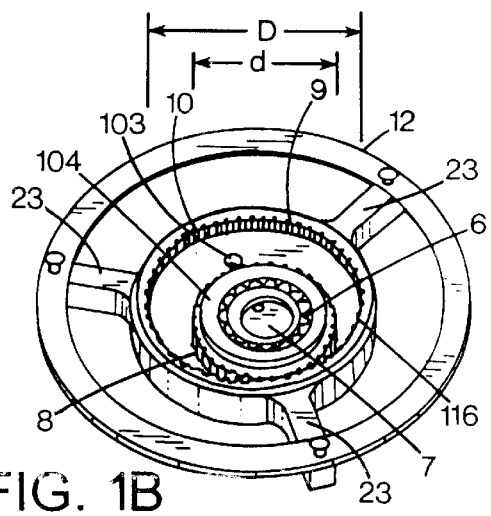
FIG. 1B is a perspective bottom of the holding member of FIG. 1.
Figure 1C:
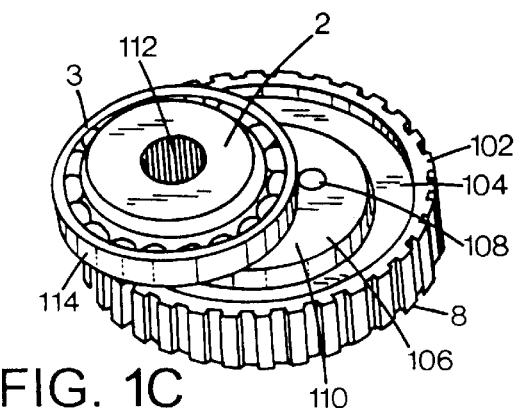
FIG. 1C is a perspective top view of a drive wheel arrangement disposed inside the holding member of Fig. 1A.
Figure 1D:
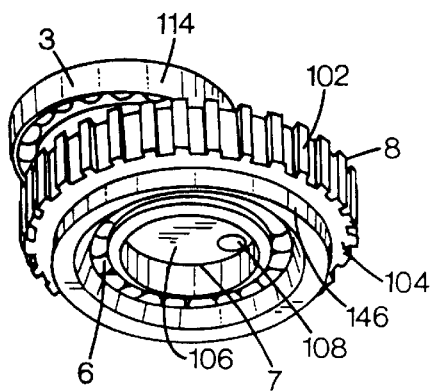
FIG. 1D is a perspective bottom view of the drive wheel arrangement of FIG. 1C.
Figure 1E:
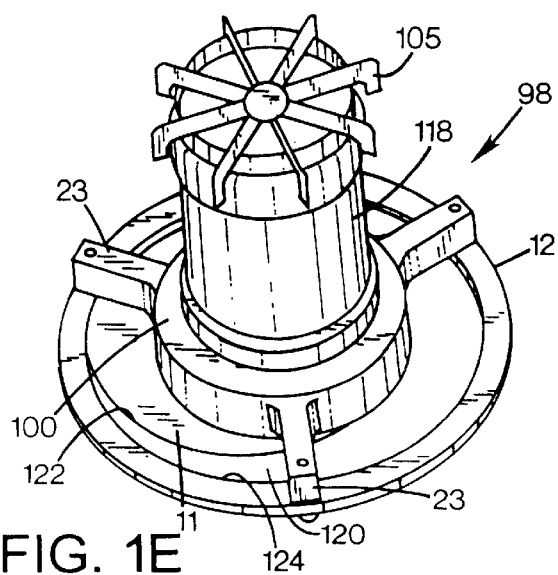
FIG. 1E is a perspective top view of the apparatus of the present invention including a motor mounted on the holding member of FIG. 1A.

More particularly, the apparatus 98 includes a holder 12 that is a round frame member including an peripheral inner surface 14. Attached on an upper surface of the holder 12 are radially protruding legs 23 of a bearing housing 100 that includes a central opening 101 and small openings 103. The housing 100 may have a fan 105 disposed at a top portion of the housing to circulate air inside the housing according to the arrows F. The openings 103 may be used to attached a driving mechanism to the housing 100. As shown in FIG. 1B, the bearing housing 100 has a round inside wall 9 that includes gripping teeth 10 for operationally engaging gripping teeth 8 on an outside surface 102 of a cog wheel 104. The cog wheel 104 has an outer diameter (d) that is less than an inner diameter (D) of the housing 100. As explained in detail below, the cog wheel 104 is eccentrically mounted inside the bearing housing 100 so that the gripping teeth 8 matchingly engage the gripping teeth 9 of the housing 100 although the diameter (d) of the wheel 104 is less than the diameter (D) of the housing 100.

A bearing 6 is disposed inside the cog wheel 104 to hold a ring-shaped cavity 7 so that the cavity 7 is rotatable relative to the cog wheel 104. The cavity 7 has a bottom 106 that includes openings 108. In this way, the bottom 106 is rotatable relative to the cog wheel 104 and the outer peripheral teeth 8. The bottom 106 is attached to the ring 2 so that the rotational speed of the bottom 106 is the same as the rotational speed of the ring 2. However, the bottom 106 also rotates eccentrically relative to the ring 2.

As is explained in detail below, the openings 108 may be used to attached accessories to the cavity 7 of the cog wheel 104. A bearing 3 is operationally engaged with a top side 110 of the cog wheel 104 so that the bearing 3 is eccentrically disposed relative to the cog wheel 104. The bearing 3 has an inner ring 2 having a opening 112 defined therein. The bearing 3 has an outside surface 114 that extends beyond the outer surface 102 of the cog wheel 104 so that when the cog wheel 104 is mounted inside the housing 100, the outside surface 114 rests on a peripheral surface 116 of the wall 9.

A driving axle of a driving source 118 is engaging the opening 112. The driving source 118 could be any suitable driving mechanism including an electric motor, a combustion engine or an external driving source with a transmission, for example, a belt driven source. It should be noted that the opening 112 is not aligned with the cavity 7 so that the cavity is shifted relative to the opening 112 to provide the eccentric relationship between the bearing 3 and the cog wheel 104.

Figure 1F:
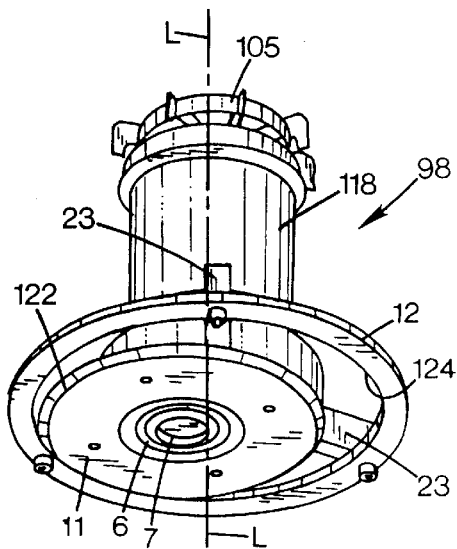
FIG. 1F is a perspective bottom view of the apparatus shown in FIG. 1E.

When the ring 2 is rotated by the driving source 118, the cog wheel 104 attached to the ring 2 is caused to rotate. Preferably, the ring 2 is co-axial and concentric with the holder 12. A bow-shaped circular knife member 11 is attached to the cog wheel 104 and is coaxial with the cog wheel 104. The knife member 11 is disposed in a space 120 that is defined between the legs 23, the holder 12 and the wall 9 of the housing 100. As best shown in FIG. 1F, the cavity 7 is radially shifted relative to the longitudinal axis L of the driving source 118 so that the knife member 11 eccentrically rotatable relative to the driving source 118. The distance between the center of the cavity 7 and the longitudinal axis L of the driving source may be adjusted to the size of the substances to be cut by a knife that is placed below the knife member 11, as described below.

The knife member 11 has an edge 122 that bears against an inner surface 124 of the holder 12 so that substances that is inserted from above or below may be cut or torn apart by the knife member 11 and the holder 12. The edge 122 may be plane, angled or toothed/jagged depending on the type of substances that are being cut by the knife member 11. Similarly, the inner surface 124 may be smooth or jagged to match to contours of the edge 122.

Because the outer diameter of the knife member 11 is less than the inner diameter of the holder 12, it may be possible to adjust the rotational speed of the knife member 11 so that the periphery of the knife member 11 travels a distance that is synchronized to be the same as the length of the inner diameter of the holder 12. In this way, the knife member 11 may include segments of teeth that are matched with segments of teeth of the holder 12. The shape or pattern of the cut profile of the substances may be designed so that the cut profile is wavy or has any other shape. This is particularly important when cutting, for example, vegetables and fruit.

FIGS. 2A–2C show a circular knife 15 attached distance to the cog wheel 104 and the knife member 11 so that a distance (G) is formed between the knife 15 and the knife member 11. In this way, the knife 15 is eccentrically rotatable relative to the driving member in operative engagement with the ring 2. The knife 15 may also have cutting wings attached to the peripheral surface of the knife 15. If the knife 15 is about 25 millimeters shifted relative to the ring 2, that is attached to the driving mechanism, the knife 15 may be used to cut substances that are within a radius that is 50 millimeters greater than the radius of the knife 15.

The knife member 15, preferably, has a sharp outer edge 128. The distance (G) is determined by radially outwardly protruding bars 126 disposed between the knife 15 and the knife member 11 (as best shown in FIG. 2C). The distance (G) determines the length or thickness of the substance that is being cut by the knife member 11. The distance (G) may be adjusted to adjust the size of the substances cut by the knife member 11.

FIG. 3 is a cross-sectional view of the apparatus 98 but a funnel 130 has been attached to the holder 12. The funnel was removed from the FIGS. 1–2 for clarity to better to the details inside the funnel 130. The funnel 130 has one function of guiding substances to be cut by the rotatable knife member 11 into the bottom of the funnel and to land on an upper surface 13 of the knife 15. The substances may eventually be caught between the legs 23 and the inside surface 124 of the holder 12 since the upper surface 13 of the knife 15 is also rotating. The legs 23 may be hollow to include a channel 125 (see FIG. 3) for carrying cooling air for the motor whether the motor is electric, hydraulic or pneumatic.

Because the knife 15 is attached to the knife member 11, the rotational speed of the knife 15 is dependent upon the gearing ratio between the teeth 8 of the cog wheel 104 and the teeth 10 of the wall 9 of the holder 12.

Figure 4A:
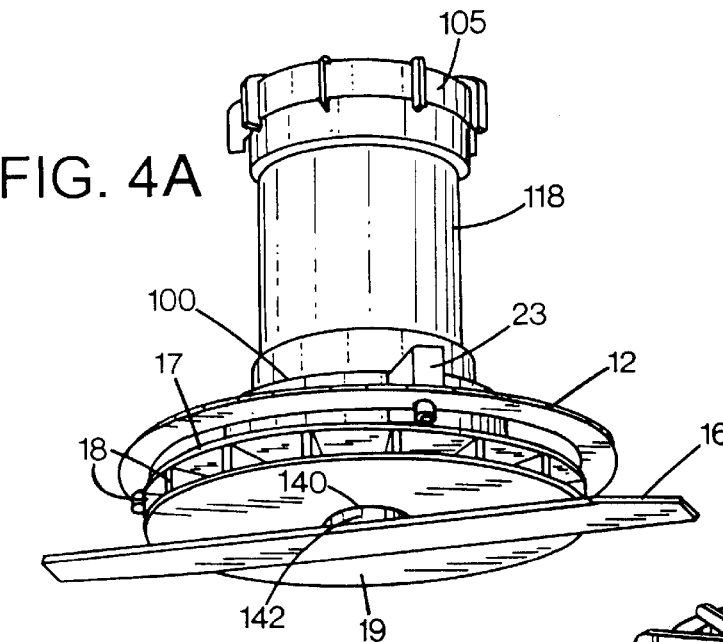
FIG. 4A is a perspective bottom view of a second embodiment of the apparatus.
Figure 4B:
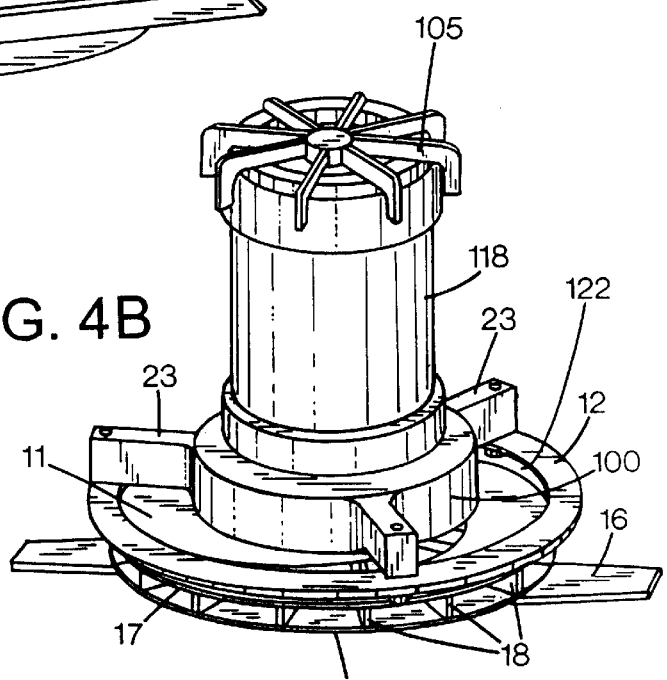
FIG. 4B is a perspective top view of the second embodiment shown in FIG. 4A.
Figure 4C:
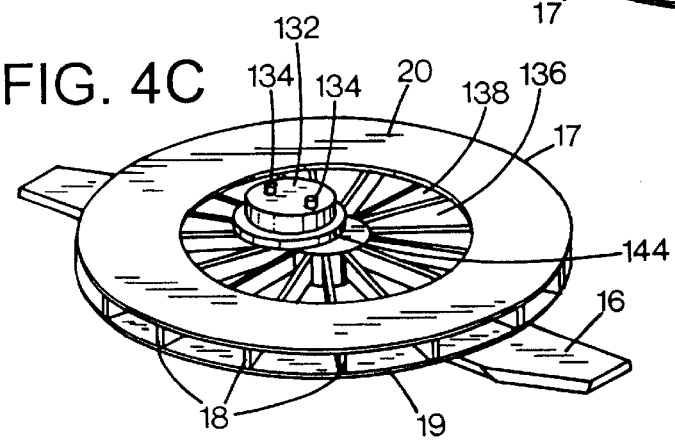
FIG. 4C is a perspective view of a fan and knife assembly for the second embodiment of the present invention.
Figure 5:
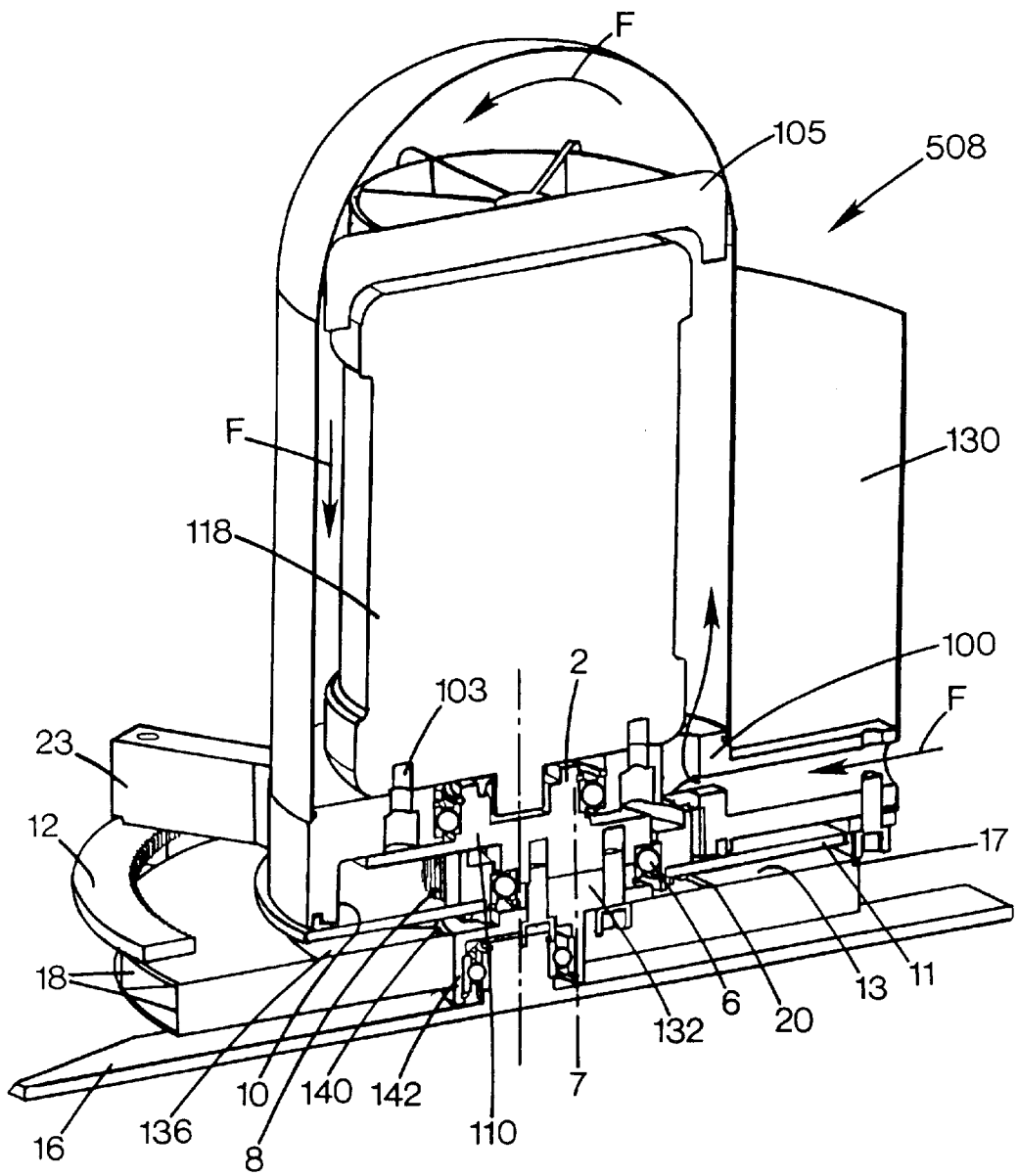
FIG. 5 is a cross-sectional view of the second embodiment shown in FIGS. 4A–4B including a funnel.

FIGS. 4–5 show an alternative embodiment of the present invention in that a driving link 132 is attached to the opening 127 of the knife member 11 so that knobs 134 extend into opening 108 of the surface 106 of the cavity 7 inside the cog wheel 104. The driving link 132 is eccentrically positioned on a round fan member 20. The driving link 132 may attached to the cog wheel 104 so that the driving link 132 is co-axial with the opening 112 of the ring 2. In this way, the rotational speed of the fan member 20 is the same as the rotational speed of the driving member that engages the opening 112 of the ring 2. In other words, the rotational speed of the fan member 20 is independent of the rotational speed of the teeth 8 of the cog wheel 104 when the teeth 8 engages the teeth 10 of the wall 9 of the holder 12. Preferably, the teeth 8 are only used to drive or rotate the knife member 11 that is attached to a bottom segment 146 of the cog wheel 104 when the fan member 20 is attached to the cog wheel 104.

The funnel 130 may be associated with safety mechanisms so that, for example, the user must stop the lawnmower, but not necessarily the rotating knife 16, before a lid on the funnel 130 may be opened to so that debris may be thrown into the funnel 130 to be cut by the knife member 11. The size of the opening into the funnel 130 may also be small enough to prevent the user to stick the user's hand too deep into the funnel 130.

The fan member 20 has an upper plate 17 having a central opening 136 defined therein and a lower plate 19 having a central opening 140 defined therein. The opening 136 is greater than the opening 140. The opening 140 only permits a driving rod 142 to extend therethrough so that an elongate knife 16 may be attached to the rod 142. A plurality of spoke wing members 18 extend radially outwardly from a hub portion 144 so that the distances between the spoke members 18 increase as the spoke members extend away from the hub portion 144.

The knife 16 may be rotatable in a bearing associated with the rod 142 so that the knife 16 only rotates when the ring 2 is rotated in a first direction and remains stationary when the ring 2 is rotated in a second opposite direction. In this way, it is possible to rotate the knife member 11 and fan member 20 only while the knife 16 is stationary. It may be advantageous to only rotate the knife member 11 and the fan member 20 when the lawnmower itself is stationary so that the knife 16 does not cut the lawn too much in one place as pieces and substances are being cut by the knife member 11. Of course, the knife 16 may be designed to rotate regardless of the rotational direction of the ring 2. It may also be possible to equip the knife member 11 with a driving mechanism so that the knife member 11 only rotates when the cog wheel 104 is rotated in a certain direction.

The upper plate 17 functions as an axial counter point to the knife member 11 so that substances that are to be cut by the knife member 11 may be supported on the upper plate 17. The opening 136 permits a portion of the ground disintegrated substances to fall therethrough while larger portions may be propelled outwardly between the upper plate 17 and the lower plate 19 by the spoke wings 18 from the hub portion 144 due to the centrifugal forces so that both substances that have been cut by the knife member 11 and the grass that have been cut by the knife 16 may be collected in the same collecting container. It should be noted that the lower plate 19 is substantially shielding the cut substances that fall in between the spoke wings 18 from the rotating knife 16 and that the only way out is radially outwardly between the spoke wings 18. In this way, both the fan member 20 and the knife 16 cooperate to propel the substances cut the by knife member 11 and the grass cut by the knife 16 due to gravitational forces. The knife 16 may also further cut the substances that fly out between the spoke wings 18.

It may be possible to adjust the cutting length of the knife member 11 so that the knife member 11 cuts very small pieces that are allowed to be propelled outwardly by the fan member 20 and then fall through the knife 16 onto the lawn. For example, fertilizers and other chemicals may be put into the funnel 130 and the fan member 20 may be used to evenly distribute the fertilizers and chemicals. If desired, the fan member 20 may also be turned upside down so that the larger opening is facing the knife 16. It may be possible to design the lawnmower so that the substances that are propelled by the fan member 20 never get into contact with the grass cut by the knife 16. For example, the housing that surrounds the knife 16 and the fan member 20 may have slots so that the fertilizers project through the housing of the lawnmower itself and directly onto the lawn. The diameter of the opening 20 should be smaller than the inner operational area of the knife member 11 and greater than the outer operational area of the knife member 11 to prevent any injury to the fingers of the person that may be caused due to the movements of the knife member.

The knife member 11 may be attached to the cog wheel 104 so that the knife member 11 may be released from the wheel 104 when the apparatus is used to rotate freely about cavity 7. In this way, the knife member 11 may only rotate and cut when the pieces of the substances are caught between the knife member 11 and the radial holding member 12.

The radial holding member 12 may be shaped to include an inwardly directed knife edge or tooth or a combination thereof. The three segments of the radial holding member 12 that are disposed between the three legs 23 may thus be equipped with an even edge, an inwardly directed knife edge or a toothed edge, respectively.

The apparatus 98 may also be turned upside down so that the knife member 11 is facing upwardly. It may be possible to attached a plate to the apparatus 98 that has a plurality of openings so that a plurality of food items, such as cucumbers, may be simultaneously fed into the knife member 11. The plate may have openings that are suitable to receive the cucumbers or any other items.

Figure 6A:
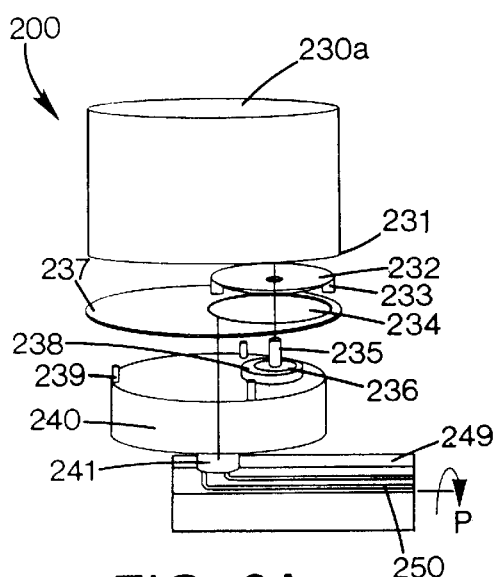
FIG. 6A is an exploded perspective view of a third embodiment of the apparatus of the present invention.
Figure 6C:
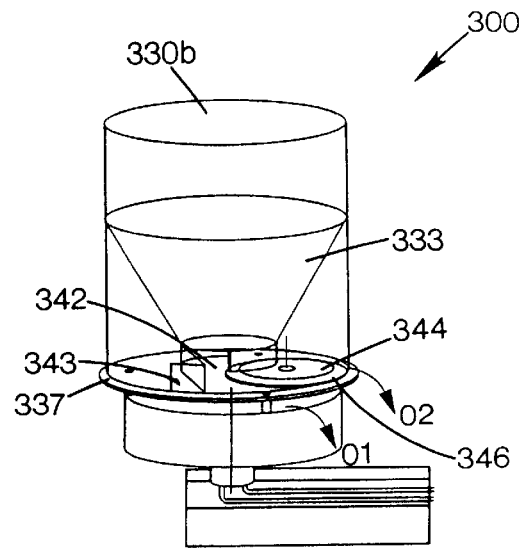
FIG. 6C is a perspective view of a fourth embodiment of the apparatus of the present invention.
Figure 6B:
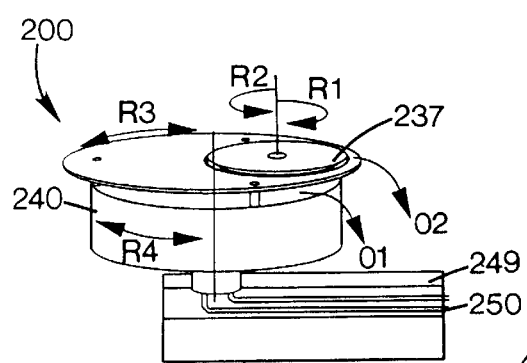
FIG. 6B is a partial perspective view of the third embodiment of the apparatus shown in FIG. 6A.

With reference to FIGS. 6A–6B, the apparatus 200 has a cylindrical housing 230a with a bottom edge 231. The apparatus 200 operates in a way that is similar to the apparatuses described in the FIGS. 1–5. The housing 230a is dimensioned to be placed on top of a round disc 237 that has an eccentric opening 234 defined therein. Preferably, the bottom edge 231 is placed on top of the disc 237 so that a narrow gap may be formed between the bottom edge 231 and an upper surface of the disc 237. A round knife 232 with vertical knives 233 attached to a bottom side of the knife 232 attached to an upwardly directed axle 235 and a disc 236 that are eccentrically placed on a disc 238. The disc 238 is connected to a driving source such as an electric motor. The knife 232 is rotatable relative to the disc 237 so that by raising or lowering the knife 232 on the axle 235 the thickness of the cut pieces may be varied since the distance between the knife 232 and the top surface of the disc 237 determines the thickness of the cut pieces. After the pieces, that are put into the housing 230a, are cut by the knives 232, 233, the cut pieces may fall down through the opening 234 and be propelled outwardly, as shown by an arrow O1, between the disc 237 and the body 240. Small pieces may also be propelled radially outwardly, as shown by an arrow O2, in a gap 45 formed between the knife 232 and the disc 237.

A relatively thick cylindrical body 240 is placed between the disc 237 and attached thereto by peripheral pins 239 so that a gap is formed between an upper surface of the body 240 and a bottom surface of the disc 237. The body 240 has a central rotor unit 241 that is connected to a driving source such as an electric motor. The unit 241 is attached to a swingable holder or motor 249 so that the body 240 may be turned about 180 degrees so that the axle 235 points downwardly. Electrical wiring 250 may extending inside the holder 249 to provide an electrical motor with power or hydraulic hoses if a hydraulic motor is used.

With reference to FIG. 6B, the knife 232 may be rotated by the axle 235 at a radial rotational speed of R1 or R2 depending upon which direction the axle is rotating. Similarly, the disc 237 may rotate at a peripheral radial speed of R3 and the body 240 at a speed of R4.

The embodiment in FIG. 6C is particularly suitable for food items, such as potatoes, that may need to have the skin removed. The apparatus 300 has a feeder 330b with a narrowing conical bottom section 333 so that the potatoes are directed to a bottom opening 342. A rotatable disc 344 is eccentrically mounted on a disc 237. The disc 344 has a conical shaped outer abrasive surface 346. The surface 346 is outwardly sloping to maintain the potatoes in position during peeling. When the potatoes are peeled, the potatoes may then be propelled out through an peripheral opening 343 defined in the housing 330b immediately above the disc 337.

Figure 6D:
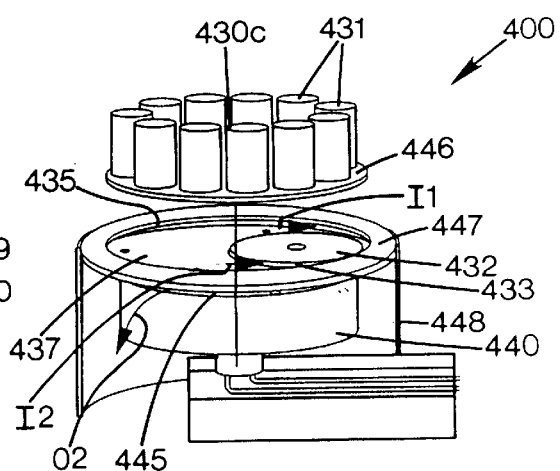
FIG. 6D is an exploded perspective view of a fifth embodiment of the apparatus of the present invention.

The embodiment in FIG. 6D is an apparatus 400 that has a stationary feeder 430c that includes a plurality of cylindrical openings 431 of a round disc 446. The apparatus 400 has a holder 447 disposed below the disc 446 and an eccentrically rotatably disc 432 that is rotatable inside the disc 447. A protective cylindrical outer wall 448 may be attached to the disc 447. Substances that are fed into the openings 431 may be cut between a sharp outer edge 433 of the disc 432 and an inside 435 of the disc 447. The substances may be fed into a gap formed between the disc 432 and a 437, as shown by an arrow I2, and exit, as shown by the arrow O2, through a gap 445 formed between a body 440. The disc 432 may have wavy, plane or teethed outer edges. The rotational speed of the disc 432 may be adjusted so that its peripheral velocity corresponds to the length of the peripheral distance of the inner wall 447 towards which the disc 432 presses the substances to be cut. The substances may also be fed into a gap formed between the disc 437 and the ring 447, as indicated by an arrow I1. The body 440 is connected to a driving rod 441 that is held in a holder 449.

Figure 7:
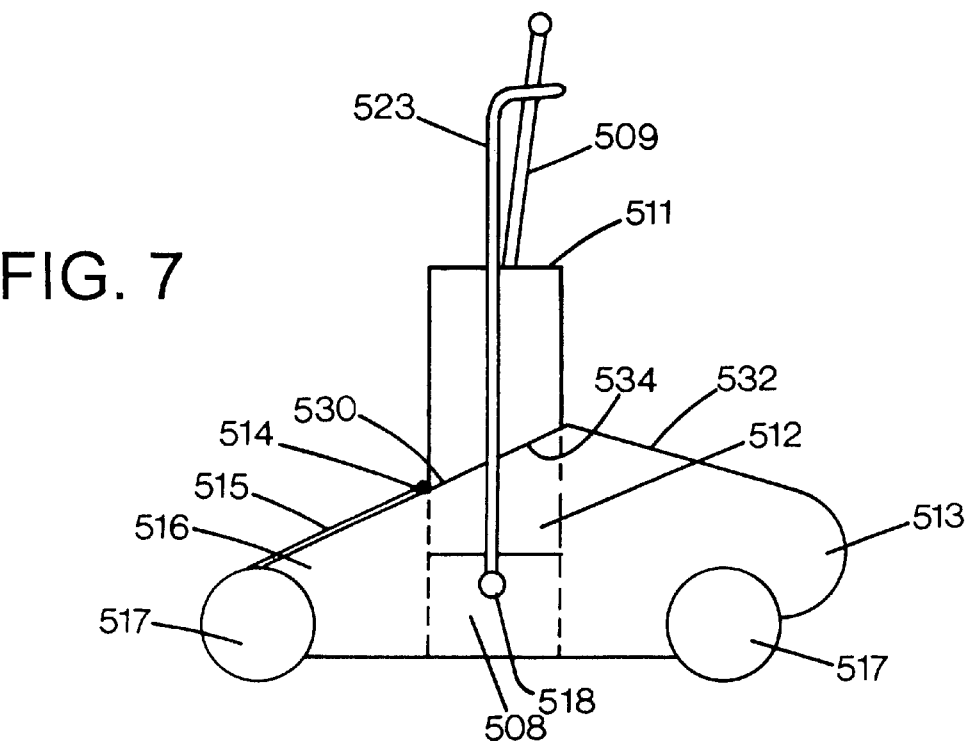
FIG. 7 is a schematic side view of a lawnmower including the apparatus of the present invention.
Figure 8:
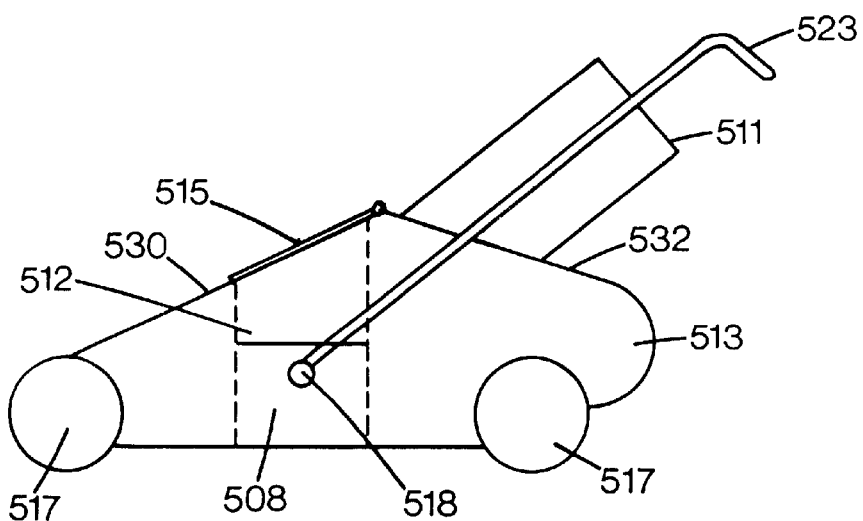
FIG. 8 is a schematic side view of the lawnmower shown in FIG. 7.

FIGS. 7–8 show the present apparatus mounted inside a lawnmower 500. The lawnmower 500 has wheels 517 and a collection device 513 for collecting cut grass and debris. The lawnmower 500 has a tiltable funnel 511 (which may be an extension of the funnel 130 shown in FIG. 5) into which debris, such as a stick 509, may be fed for disintegration. The apparatus 508 of the present invention, shown in detail in FIG. 5, is disposed inside the lawnmower 500 immediately below the funnel 511. More particularly, the apparatus 508 is disposed in a channel 512, defined in the lawnmower 500, that serves as an extension of the funnel 511. When the stick 509 is fed into the funnel, the eccentrically rotating knife 11, described above, cuts or grinds the stick 509 into small pieces that are propelled into the collection device 513.

The funnel 511 is tiltable about a pivot arm 518 between a vertical disintegration position (see FIG. 7) and a sloping lawnmower position (see FIG. 8). The lawnmower 500 has a housing 516 with a front side 530 and a rear side 532. The front side 530 is sloping forwardly and has an opening 534 defined therein at an upper portion of the front side 530 to receive the funnel 511 that is inserted through the opening 534.

A cover 515 is pivotally attached to an arm 514 that is attached to the front side 530 below the opening 534. The cover 515 is pivotal between an open position so that the funnel may be disposed inside the opening 534 and a closed position to cover the opening 534 when a handle 523, attached to the funnel 511, is pulled backwardly to the lawnmower position (see FIG. 8).

When the handle 523 is in the lawnmower position, the knife 16, best seen in FIG. 5, could be designed to rotate while the knife 11, best seen in FIG. 4, could be designed to be disengaged and stationary. When the handle 523 is then pushed into the vertical disintegration position, the knife 11 is engaged to rotate while the knife 16 is also engaged or disengaged. It may be desirable to disengage the knife 16 when the lawnmower 500 is in the disintegration position so that the knife 16 does not damage the lawn because the knife 16 is spinning while the lawnmower 500 is stationary. Of course, the apparatus could be designed to that both knives are rotatable regardless of the position of the handle 523.

While the present invention has been described in accordance with preferred compositions and embodiments, it is to be understood that certain substitutions and alterations may be made thereto without departing from the spirit and scope of the following claims.

I claim:

1. An apparatus for disintegrating substances, comprising:
   a holder having inner grip elements disposed at a periphery of the holder;
   a bearing assembly rotatably attached to the holder, the bearing assembly being co-axial with a first axis;
   a driving source in rotatable engagement with the bearing assembly;
   a wheel eccentrically mounted to the bearing assembly, the wheel having outer grip elements engagable with the inner grip elements of the holder, the wheel being rotatable about a second axis that is different from the first axis;
   a first knife member attached to the wheel and coaxial therewith; and
   a second knife member mounted on the wheel, the second knife member being rotatable about the first axis.

2. The apparatus according to claim 1 wherein the second knife member is mounted to a circular fan member.

3. The apparatus according to claim 2 wherein the fan member has an eccentrically mounted connector that is mounted inside the wheel.

4. The apparatus according to claim 3 wherein the connector is mounted to a bearing member of the wheel, the bearing member being attached to the bearing assembly.

5. The apparatus according to claim 2 wherein the fan member comprises a set of radially outwardly extending spoke wings.

6. The apparatus according to claim 5 the fan member has an upper opening defined therein for receiving substances that are cut by the first knife member.

7. The apparatus according to claim 2 wherein the fan member is disposed between the first knife member and the second knife member.

8. The apparatus according to claim 2 wherein the first knife member is eccentrically mounted to the comprises a set of radially outwardly extending spoke wings.

9. The apparatus according to claim 1 wherein the holder comprises a circular frame enclosing the first knife member so that the first knife member engages an inside of the circular frame.

10. The apparatus according to claim 1 wherein the holder has an upwardly extending funnel attached thereto.

11. The apparatus according to claim 1 wherein the holder has an upwardly extending funnel attached thereto.

12. An apparatus for disintegrating substances, comprising:
    a holder;
    a bearing assembly rotatably attached to the holder, the bearing assembly being co-axial with a first axis;
    a driving source in rotatable engagement with the bearing assembly;
    a wheel eccentrically mounted to the bearing assembly, the wheel in operative engagement with the holder, the wheel being rotatable about a second axis that is being different from the first axis;
    a first knife member attached to the wheel and coaxial therewith; and
    a spacer mounted to the first knife member; and
    a second knife member mounted to the spacer, the first and second knife members being rotatable about the second axis.

13. The apparatus according to claim 12 wherein the first knife member has an opening defined therein for receiving an extension of the wheel.

14. The apparatus according to claim 12 wherein the first knife member is concentric with the second knife member.

15. The apparatus according to claim 14 wherein the first knife member is connected to a first motor and the second knife member is connected to a second motor.

16. The apparatus according to claim 12 wherein the holder has radially outwardly extending leg members.

17. The apparatus according to claim 12 wherein the holder comprises a circular frame enclosing the first knife member so that the first knife member engages an inside of the circular frame.

18. An apparatus for disintegrating substances, comprising:
    a lawnmower housing;
    a tiltable handle pivotally attached to the lawnmower housing, the handle being tiltable between a lawnmower position and a disintegration position;
    a holder having inner grip elements disposed at a periphery of the holder;

a bearing assembly rotatably attached to a holder attached to the lawnmower housing, the bearing assembly being co-axial with a first axis;

a driving source in rotatable engagement with the bearing assembly;

a wheel eccentrically mounted to the bearing assembly, the wheel being rotatable about a second axis that is different from the first axis;

a first knife member attached to the wheel and coaxial therewith;

a second knife member mounted on the wheel, the second knife member being rotatable about the first axis;

the first knife member being rotatable when the handle is in the disintegration position and stationary when the handle is in the lawnmower position; and the second knife member being rotatable when the handle is in the lawnmower position.

19. The apparatus according to claim 18 wherein the lawnmower housing has a tiltable funnel that is attached to the tiltable handle.

20. The apparatus according to claim 19 wherein the lawnmower housing has a cover that covers an opening defined in the lawnmower housing when the handle is in the lawnmower position.

* * * * *